April 12, 1927.
A. WALTER ET AL
1,624,521
HARROW
Filed May 21, 1925
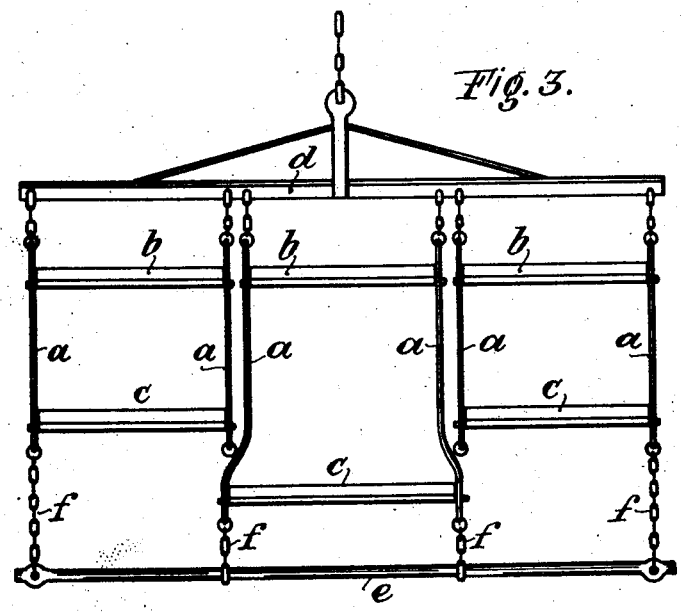
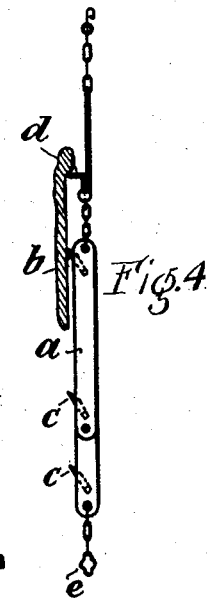
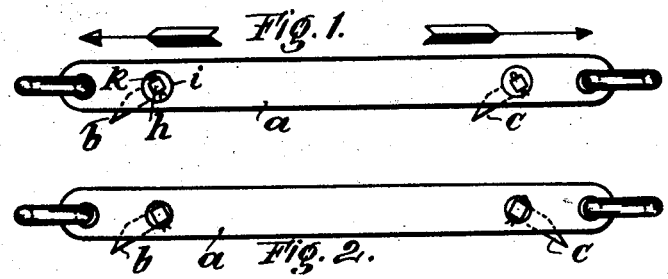
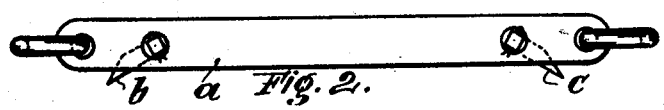
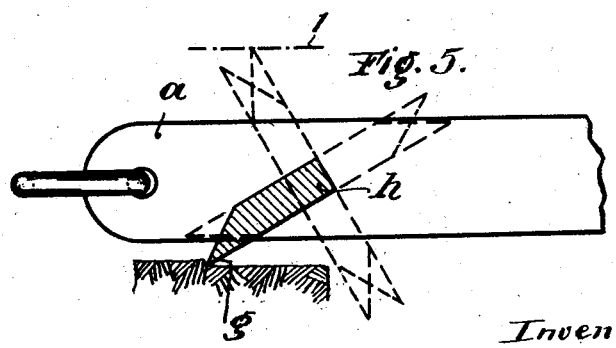
Inventors
Arthur Walter &
Wilhelm Kruttrup
by Henry Orthof
Atty.

Patented Apr. 12, 1927.

1,624,521

UNITED STATES PATENT OFFICE.

ARTHUR WALTER, OF SCHWEINFURT-ON-THE-MAIN, AND WILHELM KUTTRUF, OF SELIGENSTADT, NEAR WURZBURG, GERMANY, ASSIGNORS TO MASCHENENFABRIK WALTER & KUFFER, OF SCHWEINFURT-ON-THE-MAIN, GERMANY.

HARROW.

Application filed May 21, 1925, Serial No. 31,925, and in Germany July 8, 1924.

This invention relates to improvements in harrows and more particularly to harrows of the sledge type in which cutter-bars are employed for soil cultivation, and consists in the arrangement of a plurality of cutter-bars so as to form a rigid frame or frames with lateral frame members, the latter forming sledge-runners, the cutter-bars being adapted to be adjusted in their positions relatively to the frame and to the ground, without impairing the rigidity of the frame units.

A sledge-harrow according to this invention differs from known implements of this type in that the cutter-bars are rigidly connected with their associated lateral frame members, but are adjustably mounted on the latter. The sledge-runners travel directly upon the ground and serve for regulating the depth of engagement of the cutter-bars in the soil.

The sledge harrow may comprise a plurality of frame units, each consisting of two lateral frame members between which are mounted two or more cutter-bars. The inclination of the cutter-bars may be optionally varied in order to carry out various kinds of soil cultivations. The cutters themselves are bevelled or sharpened on one edge and are mounted outside the central longitudinal axis of the frame members, so that by changing the positions of the cutters or by turning the harrow over, various positions of the cutter-bars relatively to the frame and to the ground may be attained, and thus any condition of the soil may be dealt with.

One form of construction is shown by way of example, in the accompanying drawings in which:

Fig. 1 shows one unit of the harrow in side elevation with the cutter-bars set in the same direction and inclination;

Fig. 2 shows the same harrow unit with the cutter-bars set in different directions;

Fig. 3 shows in plan view three units assembled to form a sledge-harrow. Fig. 4 is a side elevation of Fig. 3;

Fig. 5 shows, on an enlarged scale, various directions in which the cutter-bars may be arranged.

Each harrow unit consists of two lateral frame members $a$, which are connected by two cutter-bars $b$ and $c$. The units are connected, say by chains, to a draw-bar $d$ and, if desired, at the rear, a smoothing or levelling bar $e$ may be attached, by means of chains $f$.

The acting faces of the cutter-bars are bevelled from one side, as may be seen clearly in Fig. 5; the cutting edge $g$ is thus not situated in the middle longitudinal plane of the bar. Each cutter-bar is provided at its ends with square end portions $h$, which are inserted in corresponding square holes in the lateral frame members $a$ and secured by washers $i$ and split-pins $k$. This arrangement enables a very easy and quick removal and change of position of the cutter-bars to be effected.

The change of position is effected by inserting the square ends $h$ at various angularities into the corresponding holes in the lateral frame members $a$, as may be seen from the various positions, shown in broken lines in Fig. 5. Each cutter-bar can thus have four different positions and the position of its cutting edge, relatively to the ground may be still further altered by turning the entire sledge-harrow upside down, as indicated in Fig. 5, the dot and dash line 1, when the drawing is reversed, representing the ground. In this manner eight different positions by varying their position of the cutter-blades are attainable relatively one to the other and to the ground and the angle of cut can again be altered by reversing the direction of travel of the harrow, so that sixteen cutting angles are obtained.

The holes for the cutter-blades in the lateral frames $a$ are advantageously arranged either above or below the central longitudinal axis $a'$ (Figure 1) of the frames, so that, when employed in an inverted position, the cutter-bars will project either more or less than was the case when in the normal position.

We claim—

1. A harrow comprising lateral sledge bars having rectangular openings therethrough whose diagonals are inclined to the vertical, and cutter-bars having ends shaped to fit said openings and means to secure said ends in said openings.

2. A harrow, comprising lateral sledge bars having rectangular openings therethrough whose centres are disposed to one side of the longitudinal central plane of said bars and whose diagonals are inclined thereto, and cutter bars having ends to fit said openings and means to secure said ends in said openings.

In testimony that we claim the foregoing as our invention, we have signed our names this 4th day of May, 1925.

ARTHUR WALTER.
WILHELM KUTTRUF.